(12) United States Patent
Kim et al.

(10) Patent No.: US 11,709,530 B2
(45) Date of Patent: **\*Jul. 25, 2023**

(54) ELECTRONIC DEVICE AND OPERATION CONTROL METHOD THEREOF

(71) Applicant: Samsung Electronics Co., Ltd., Gyeonggi-do (KR)

(72) Inventors: Heetae Kim, Gyeonggi-do (KR); Kuntak Kim, Gyeonggi-do (KR); Mansu Yang, Gyeonggi-do (KR); Seungchul Choi, Gyeonggi-do (KR); Kyungha Koo, Seoul (KR); Soongyu Kwon, Gyeonggi-do (KR); Soohyun Moon, Gyeonggi-do (KR); Kyungsoo Seo, Gyeonggi-do (KR); Myungkee Lee, Gyeonggi-do (KR); Jihwan Lim, Gyeonggi-do (KR); Hyuntae Jang, Seoul (KR); Kyejeong Jeong, Gyeonggi-do (KR)

(73) Assignee: Samsung Electronics Co., Ltd

( \* ) Notice: Subject to any disclaimer, the term of this patent is extended or adjusted under 35 U.S.C. 154(b) by 0 days.

This patent is subject to a terminal disclaimer.

(21) Appl. No.: 17/554,389

(22) Filed: Dec. 17, 2021

(65) Prior Publication Data

US 2022/0107674 A1 Apr. 7, 2022

Related U.S. Application Data

(63) Continuation of application No. 16/109,176, filed on Aug. 22, 2018, now Pat. No. 11,262,823.

(30) Foreign Application Priority Data

Aug. 23, 2017 (KR) .................. 10-2017-0106682

(51) Int. Cl.
*G06F 1/32* (2019.01)
*G06F 1/20* (2006.01)
(Continued)

(52) U.S. Cl.
CPC .............. *G06F 1/206* (2013.01); *G06F 1/324* (2013.01); *G06F 1/3296* (2013.01); *G06F 1/26* (2013.01)

(58) Field of Classification Search
CPC ................................... G06F 1/26; G06F 1/32
See application file for complete search history.

(56) References Cited

U.S. PATENT DOCUMENTS 7,036,030 B1 \* 4/2006 Altmejd .................. G06F 1/324
713/322
9,652,019 B2 5/2017 Dongara
(Continued)

FOREIGN PATENT DOCUMENTS

CN 102447216 5/2012
CN 103119850 5/2013
(Continued)

OTHER PUBLICATIONS

International Search Report dated Nov. 13, 2018 issued in counterpart application No. PCT/KR2018/009679, 3 pages.
(Continued)

*Primary Examiner* — Phil K Nguyen
(74) *Attorney, Agent, or Firm* — The Farrell Law Firm, P.C.

(57) ABSTRACT

A method of an electronic device are provided in which current consumption for one or more components of the electronic device is compared with a predetermined current. A first surface temperature of the electronic device is determined based on the comparison and power consumption of the one or more components. A location is detected where
(Continued)

heat corresponding to the first surface temperature is generated. A second surface temperature of the electronic device is obtained based on power consumption of a component disposed in the electronic device corresponding to the location where the heat is generated. A target temperature is set based on the obtained second surface temperature. The component is controlled to reduce the power consumption of the component based on the target temperature.

22 Claims, 12 Drawing Sheets

(51) Int. Cl.
*G06F 1/3296* (2019.01)
*G06F 1/324* (2019.01)
*G06F 1/26* (2006.01)

(56) References Cited

U.S. PATENT DOCUMENTS

| | | | |
|---|---|---|---|
| 10,156,987 | B1 | 12/2018 | Gutierrez |
| 10,198,049 | B2* | 2/2019 | Kwon .................... G05B 15/02 |
| 2006/0095913 | A1 | 5/2006 | Bodas |
| 2007/0067136 | A1 | 3/2007 | Conroy |
| 2008/0028778 | A1 | 2/2008 | Millet |
| 2008/0059004 | A1* | 3/2008 | Katoh ................ G05D 23/1919 713/600 |
| 2009/0055665 | A1 | 2/2009 | Maglione |
| 2009/0228893 | A1 | 9/2009 | Behrendt |
| 2011/0055597 | A1 | 3/2011 | Wyatt |
| 2011/0224837 | A1 | 9/2011 | Moss |
| 2012/0075992 | A1 | 3/2012 | Shahidi et al. |
| 2012/0087384 | A1 | 4/2012 | Zayer et al. |
| 2012/0096288 | A1 | 4/2012 | Bates |
| 2013/0120630 | A1 | 5/2013 | Kim et al. |
| 2014/0068296 | A1 | 3/2014 | Byom et al. |
| 2014/0115361 | A1 | 4/2014 | Martin et al. |
| 2014/0121854 | A1 | 5/2014 | Conroy |
| 2015/0103866 | A1 | 4/2015 | Samadi |
| 2015/0248136 | A1 | 9/2015 | Han et al. |
| 2015/0286262 | A1 | 10/2015 | Park |
| 2015/0348493 | A1 | 12/2015 | Chae et al. |
| 2015/0378404 | A1* | 12/2015 | Ogawa .................. G05B 15/02 700/300 |
| 2016/0062326 | A1 | 3/2016 | Bang et al. |
| 2016/0070327 | A1 | 3/2016 | Nemani et al. |
| 2016/0139589 | A1 | 5/2016 | Chandra et al. |
| 2016/0252939 | A1* | 9/2016 | Bang ..................... G06F 1/203 713/340 |
| 2016/0266628 | A1 | 9/2016 | Jain et al. |
| 2017/0075397 | A1 | 3/2017 | Saeidi |
| 2017/0168514 | A1 | 6/2017 | Mittal et al. |
| 2017/0220022 | A1 | 8/2017 | Hankendi |
| 2019/0360954 | A1* | 11/2019 | Kubota ................. G01N 25/20 |

FOREIGN PATENT DOCUMENTS

| | | |
|---|---|---|
| CN | 103918189 | 7/2014 |
| CN | 105388931 | 3/2016 |
| CN | 106062653 | 10/2016 |
| JP | 2005-018309 | 1/2005 |
| KR | 10-2015-0102481 | 9/2015 |
| KR | 1020150136440 | 12/2015 |
| KR | 1020160104965 | 9/2016 |
| WO | WO 2017/099987 | 6/2017 |

OTHER PUBLICATIONS

European Search Report dated Jul. 15, 2020 issued in counterpart application No. 18849308.4-1203, 12 pages.
Chinese Office Action dated Dec. 10, 2021 issued in counterpart application No. 201880054660.4, 23 pages.
Korean Office Action dated Mar. 24, 2022 issued in counterpart application No. 10-2017-0106682, 14 pages.
Chinese Office Action dated Oct. 14, 2022 issued in counterpart application No. 201880054660.4, 11 pages.

* cited by examiner

ELECTRONIC DEVICE AND OPERATION CONTROL METHOD THEREOF

CROSS-REFERENCE TO RELATED APPLICATION(S)

The present application is a Continuation Application of U.S. application Ser. No. 16/109,176, filed in the U.S. Patent and Trademark Office on Aug. 22, 2018, which is based on and claims priority under 35 U.S.C. § 119(a) to Korean Patent Application Serial number 10-2017-0106682, which was filed on Aug. 23, 2017, in the Korean Intellectual Property Office, the entire disclosures of which are incorporated herein by reference.

BACKGROUND

1. Field

The present disclosure relates, generally, to an electronic device, and more particularly, to an operation control method of the electronic device.

2. Description of Related Art

Various electronic devices, such as a smart phone, a tablet personal computer (tablet PC), a portable multimedia player (PMP), a personal digital assistant (PDA), a laptop PC, and wearable devices such as a wristwatch, a head-mounted display (HMD), and the like, may include various components. As can be appreciated, the various components associated with these electronic devices generate a relatively large or excessive amount of heat during operation thereof, and as such, controlling the generated heat is of particular importance, so as to prevent performance deterioration or a low temperature burn while a user uses the electronic device.

To control this unwanted heat, electronic device can be configured to use temperature information provided by a thermistor that is included in the electronic device. However, since a difference between an internal temperature and a surface temperature of the electronic device is not constant, it is sometimes difficult to specify or determine an accurate point where the heat is generated and a point in time for controlling the generated heat, and as a result, the electronic device may not perform as intended, or may perform at less than an acceptable standard.

SUMMARY

The disclosure has been made to address at least the disadvantages described above and to provide at least the advantages described below. Accordingly, an aspect of the disclosure provides a method for predicting current consumption and/or a temperature of generated heat for each component of an electronic device to effectively control the temperature and operation of the electronic device.

An aspect of the disclosure provides a method for analyzing a user pattern using information obtained by predicting current consumption and/or the temperature of generated heat for each component of an electronic device.

Another aspect of the disclosure provides a method for predicting current consumption and/or the temperature of generated heat for each component of an electronic device and for informing a user of the information so that the user can control operation of a corresponding component that is generating heat.

In accordance with an aspect of the disclosure, a control method of an electronic device is provided. Current consumption for one or more components of the electronic device is compared with a predetermined current. A first surface temperature of the electronic device is determined based on the comparison and power consumption of the one or more components. A location is detected where heat corresponding to the first surface temperature is generated. A second surface temperature of the electronic device is obtained based on power consumption of a component disposed in the electronic device corresponding to the location where the heat is generated. A target temperature is set based on the obtained second surface temperature. The component is controlled to reduce the power consumption of the component based on the target temperature.

In accordance with an aspect of the disclosure, an electronic device is provided for controlling current consumption and heat generation for one or more components of the electronic device. The electronic device includes a memory and a processor. The processor is configured to compare current consumption for the one or more components with a predetermined current, and determine a first surface temperature of the electronic device based on the comparison and power consumption of the one or more components. The processor is also configured to detect a location where heat corresponding to the first surface temperature is generated, and obtain a second surface temperature of the electronic device based on power consumption of a component disposed in the electronic device corresponding to the location where the heat is generated. The processor is further configured to set a target temperature based on the obtained second surface temperature, and control the component to reduce the power consumption of the component based on the target temperature.

BRIEF DESCRIPTION OF THE DRAWINGS

The above and other aspects, features and advantages of certain embodiments of the disclosure will be more apparent from the following detailed description taken in conjunction with the accompanying drawings, in which.

DETAILED DESCRIPTION

Figure 1:
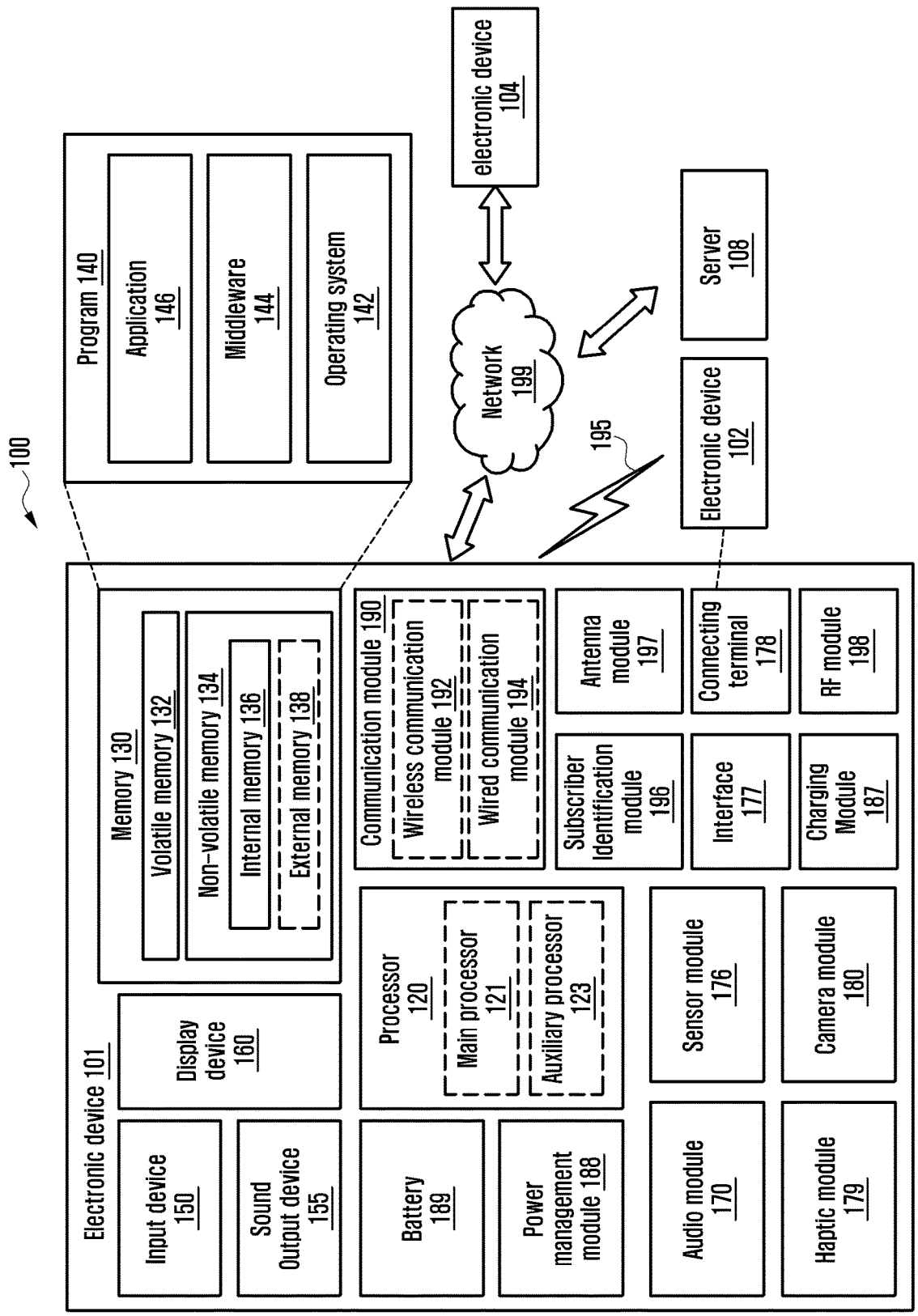
FIG. 1 is a diagram of an electronic device in a network environment, according to an embodiment.

Embodiments of the disclosure will be described herein below with reference to the accompanying drawings. However, the embodiments of the disclosure are not limited to the specific embodiments and should be construed as including all modifications, changes, equivalent devices and methods, and/or alternative embodiments of the present disclosure. In the description of the drawings, similar reference numerals are used for similar elements. The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may use corresponding components regardless of importance or an order and are used to distinguish a component from another without limiting the components. These terms may be used for the purpose of distinguishing one element from another element. For example, a first user device and a second user device may indicate different user devices regardless of the order or importance. For example, a first element may be referred to as a second element without departing from the scope the disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor (AP)) capable of performing a corresponding operation by executing one or more software programs stored in a memory device.

The terms used in describing the various embodiments of the disclosure are for the purpose of describing particular embodiments and are not intended to limit the disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the disclosure.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the disclosure may include at least one of an application-specific integrated circuit (ASIC) chip, a field-programmable gate array (FPGA), and a programmable-logic device for performing operations which has been known or are to be developed hereinafter.

An electronic device according to the disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

The electronic device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM) in banks, point of sales (POS) devices in a shop, or an Internet of things (IoT) device (e.g., a light bulb, various sensors, electric or gas meter, a sprinkler device, a fire alarm, a thermostat, a streetlamp, a toaster, a spoiling goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may also be a flexible device. Further, the electronic device is not limited to the aforementioned devices, and may include an electronic device according to the development of new technology.

Hereinafter, an electronic device will be described with reference to the accompanying drawings. In the disclosure, the term "user" may indicate a person using an electronic device or a device (e.g., an artificial intelligence electronic device) using an electronic device.

FIG. 1 is a diagram of an electronic device 101 in a network environment 100, accord to an embodiment. The electronic device 101 in the network environment 100 may communicate with an electronic device 102 via a first network 195 (e.g., a short-range wireless communication network), or an electronic device 104 or a server 108 via a second network 199 (e.g., a long-range wireless communication network). The electronic device 101 may also communicate with the electronic device 104 via the server 108.

The electronic device 101 may include a processor 120, memory 130, an input device 150, a sound output device 155, a display device 160, an audio module 170, a sensor module 176, an interface 177, a haptic module 179, a camera module 180, a charging module 187, a power management module 188, a battery 189, a communication module 190, a subscriber identification module (SIM) 196, an antenna module 197 or a radio frequency (RE) module 198. At least one (e.g., the display device 160 or the camera module 180) of the components may be omitted from the electronic device 101, or one or more other components may be added in the electronic device 101. Some of the components may be implemented as single integrated circuitry, or system on chip. For example, the sensor module 176 (e.g., a fingerprint sensor, an iris sensor, or an illuminance sensor) may be implemented as embedded in the display device 160 (e.g., a display).

The processor 120 may execute software e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121. The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an image signal processor or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include software (e.g., the program 140) and input data or output data for a command related thereto. The memory 130 may include the volatile memory 132 or the non-volatile memory 134.

The program 140 may be stored in the memory 130 as software, and may include an operating system (OS) 142, middleware 144, or an application 146.

The input device 150 may receive a command or data to be used by other components (e.g., the processor 120) of the electronic device 101, from the outside (e.g., a user) of the electronic device 101. The input device 150 may include a microphone, a mouse, or a keyboard.

The sound output device 155 may output sound signals to the outside of the electronic device 101. The sound output device 155 may include a speaker or a receiver. The speaker may be used for general purposes, such as playing multimedia or playing record, and the receiver may be used for an incoming calls. The receiver may be implemented as separate from, or as part of the speaker.

The display device 160 may visually provide information to the outside of the electronic device 101. The display device 160 may include a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the sound output device 155 or a headphone of the electronic device 102 directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and generate an electrical signal or data value corresponding to the detected state. The sensor module 176 may include a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the electronic device 102 directly (e.g., wiredly) or wirelessly. The interface 177 may include a high definition multimedia interface (HDMI), a universal serial bus (USB) interface, a secure digital (SD) card interface, or an audio interface.

A connecting terminal 178 may include a connector via which the electronic device 101 may be physically connected with the electronic device 102. The connecting terminal 178 may include an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include a motor, a piezoelectric element, or an electric stimulator.

The camera module 180 may capture a still image or moving images, and the camera module 180 may include one or more lenses, image sensors, image signal processors, or flashes.

The charging module 187 may be integrated into the power management module 188 and may be operated independently from the power management module 188.

The charging module 187 may have a wired and/or wireless charging scheme.

The charging module 187 may charge the battery 189 using power supplied from an external power source for the electronic device 101.

The charging module 187 may select a charging mode based on at least some of the type of external power source e.g., power adapter, USB or wireless charging), the amount of power available from the external power source (e.g. about 20 watts or more), or the attributes of the battery 189 (e.g., normal charge or rapid charge). The charging module 187 may charge the battery 189 using the selected charging mode.

The external power source may be wired through a connection terminal 178 or wirelessly connected via an antenna module 197.

The charging module 187 may generate a plurality of powers having different voltages or different current levels by adjusting the voltage level or the current level of the power supplied from the external power source or the battery 189.

The charging module 187 may adjust the power of the external power supply or battery 189 to a voltage or current level suitable for each component of the components included in the electronic device 101.

The charging module 187 may be implemented in the form of a low dropout (LDO) regulator or a switching regulator.

The charging module 187 can measure the usage status information (e.g., the capacity, of the battery, the number of charge/discharge cycles, the voltage, or the temperature) of the battery 189.

The charging module 187 determines charging status information (e.g., battery lifetime, overvoltage, undervoltage, overcurrent, overcharge, overdischarge, overheat, short circuit, or swelling) associated with charging the battery 189 based at least in part on the measured usage status information. The charging module 187 may determine whether the battery 189 is in an abnormal state or a normal state based on at least a part of the determined charging state information, and may adjust the charging of the battery 189 when the battery, state is determined to be abnormal.

The power management module 188 may manage power supplied to the electronic device 101. The power management module 188 may be implemented as at least part of a power management integrated circuit (PMIC).

The battery 189 may supply power to at least one component of the electronic device 101. The battery 189 may include a primary cell which is not rechargeable, a secondary cell which is rechargeable, or a fuel cell.

The communication module 190 may support establishing a direct communication channel or a wireless communication channel between the electronic device 101 and the electronic device 102, the electronic device 104, or the server 108 and performing communication via the established communication channel. The communication module 190 may include one or more communication processors that are operable independently from the processor 120 (e.g., the AP) and supports a direct communication or a wireless communication. The communication module 190 may include a wireless communication module 192 (e.g., a cellular communication module, a short-range wireless communication module, or a global navigation satellite system (GLASS) communication module) or a wired communication module 194 (e.g., a local area network (LAN) communication module or a power line communication (PLC) module). A corresponding one of these communication modules may communicate with the external electronic device via the first network 195 (e.g., a short-range communication network, such as Bluetooth (BT)™, wireless-fidelity (Wi-fi) direct, or Infrared Data Association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 195 or the second network 199, using subscriber information (e.g., international mobile subscriber identity (IMSI)) stored in the SIM 196.

The antenna module 197 may transmit or receive a signal or power to or from the outside (e.g., an external electronic device) of the electronic device 101. The antenna module 197 may include one or more antennas, and at least one of those antennas can be used for a communication scheme used in the communication network, such as the first network 195 or the second network 199. An antenna of the one or more antennas may be selected by the communication module 190 (e.g., the wireless communication module 192). The signal or the power may then be transmitted or received between the communication module 190 and the external electronic device via the selected at least one antenna.

The RF module 198 may send and receive communication signals (e.g., RF signals). The RF module 198 may include a transceiver, a power amplifier module (PAM), a frequency filter, a low noise amplifier (LNA), or an antenna. At least one of the RF modules can transmit and receive RF signals via separate RF modules.

The antenna module 197 and the RF module 198 may be integrated on the electronic device 101.

At least some of the above-described components may be coupled mutually and may communicate signals (e.g., commands or data) therebetween via an inter-peripheral communication scheme (e.g., a bus, general purpose input and output (GPIO), serial peripheral interface (SPI), or mobile industry processor interface (MIPI).

Commands or data may be transmitted or received between the electronic device 101 and the external electronic device 104 via the server 108 coupled with the second network 199, Each of the electronic devices 102 and 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, the electronic device 101 may request the one or more external electronic devices 102, 104, or 108 to perform at least part of the function or the service. The one or more external electronic devices 102, 104, or 108 receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used.

The functions of the components of the electronic device 101 may be implemented as software (e.g., the program 140) including one or more instructions that are stored in a storage medium (e.g., internal memory 136 or external memory 138) that is readable by the electronic device 101. For example, the processor 120 of the electronic device 101 may invoke at least one of the one or more instructions stored in the storage medium, and execute it, with or without using one or more other components under the control of the processor 120, thereby allowing the electronic device 101 to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" can be defined as a storage medium that is a tangible device, and does not include a signal (e.g., an electromagnetic wave), but this term does not differentiate between where data is semi-permanently stored in the storage medium and where the data is temporarily stored in the storage medium.

The methods described herein may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components may be integrated into a single component. The integrated component may perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 2:
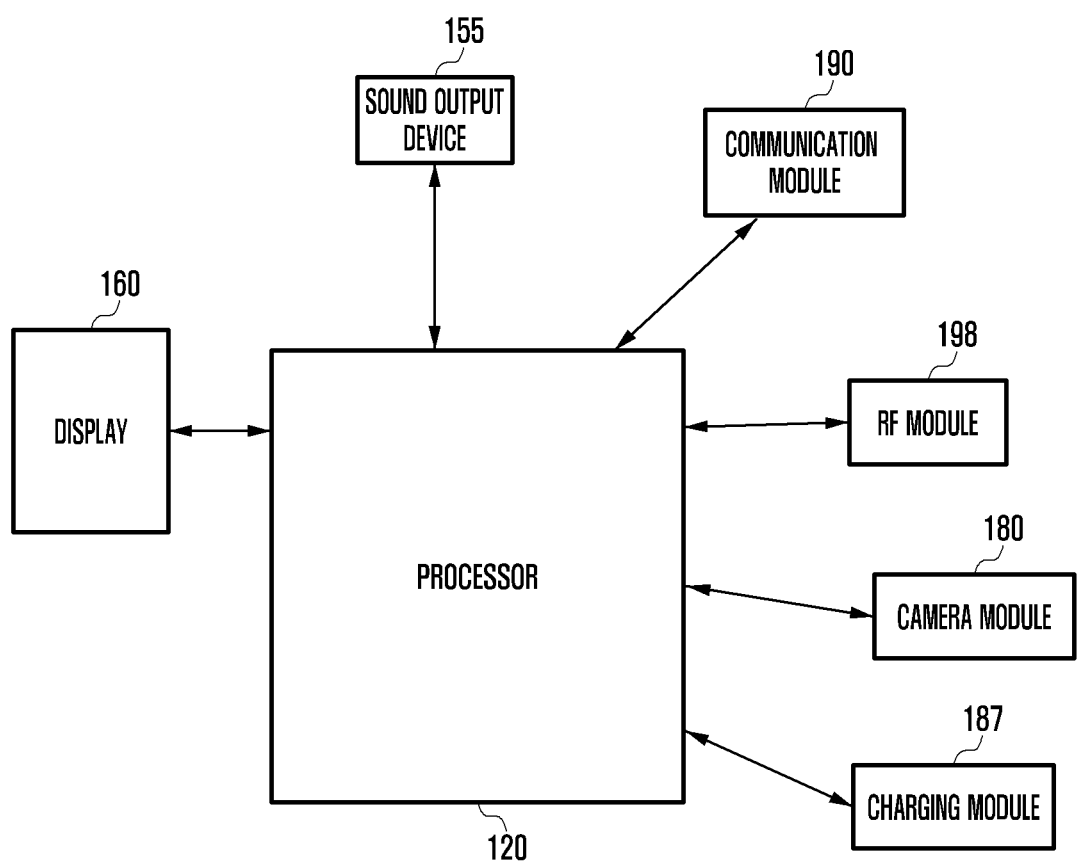
FIG. 2 is a diagram of an operation performed between a processor and a component of an electronic device, according to an embodiment.

FIG. 2 is a diagram of an operation performed between the processor 120 and a component of the electronic device 101, according to an embodiment.

As noted above, the electronic device 101 may include the processor 120, the display 160, the sound output device 155, the communication module 190, the RF module 198, and the camera module 180.

The display 160, the sound output device 155, the communication module 190, the RF module 198, and the camera module 180 may transmit information associated with current consumption to the processor 120.

When the processor 120 receives the information associated with the current consumption, the processor 120 may predict a surface temperature based on the information associated with the current consumption, and may control an operation of a component where heat is generated.

According to various embodiments, when the processor 120 receives the information associated with the current consumption, the processor 120 may determine a surface temperature to be predicted based on the information associated with the current consumption, and may control an operation of a component where heat is generated.

For example, when the processor 120 is the component in which heat is being generated, the processor 120 may limit operation of a clock of the processor 120. The operation of limiting the clock of the processor 120 may be an operation of changing a high-speed clock to a low-speed clock, or other operation.

When the display 160 is the component in which heat is being generated, the processor 120 may adjust a brightness of the display 160.

When the sound output device 155 is the component in which heat is being generated, the processor 120 may lower a volume of sound output from the sound output device 155.

When the communication module 190 is the component in which heat is being generated, the processor 120 may adjust a throughput of the communication module 190.

When the RF module 198 is the component in which heat is being generated, the processor 120 may adjust a transmit power of the RF module 198.

When the camera module 180 is the component in which heat is being generated, the processor 120 may adjust a frame rate of a camera module 180.

When the charging module 187 is the component in which heat is being generated, the processor 120 may adjust a charging current of the charging module 187.

Figure 3:
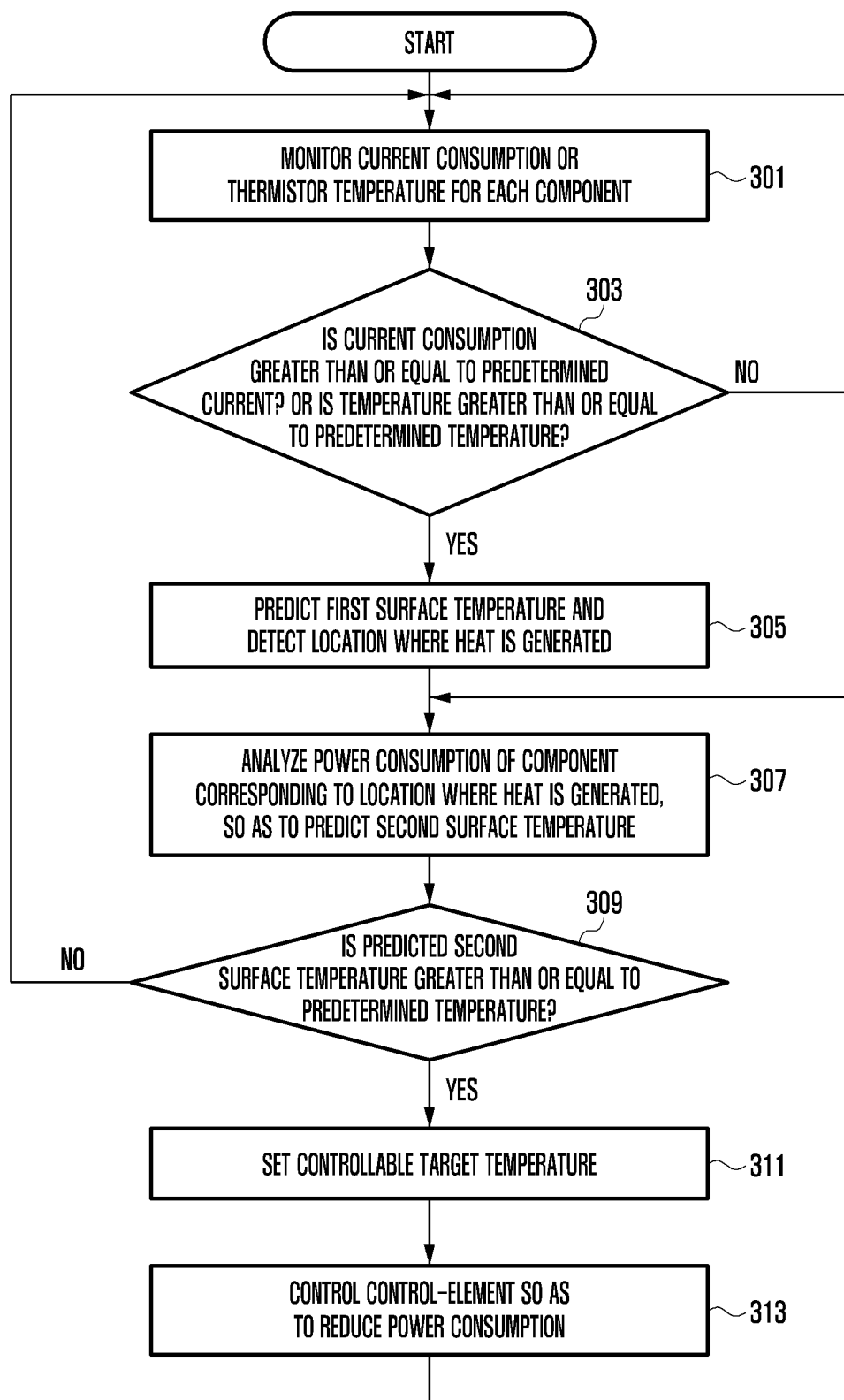
FIG. 3 is a flowchart of a method for predicting and controlling a surface temperature by a component of an electronic device, according to an embodiment.

FIG. 3 is a flowchart of a method of predicting and controlling a surface temperature by a component of the electronic device 101, according to an embodiment.

In step 301, the electronic device 101 may monitor current consumption for each component or may monitor the temperature of a thermistor under the control of the processor 120. Hereinafter, unless otherwise stated, it will be assumed that all steps of the methods are performed under the control of the processor 120.

For example, the processor 120 may receive detected power information via the power management module 188, and predict current consumption based on the power information.

According to various embodiments, the processor 120 may receive detected power information via the power management module 188, and determine current consumption to be predicted based on the power information.

The operation in which the electronic device 101 monitors current consumption may be an operation in which the display 160 calculates a brightness ratio by multiplying a current consumption coefficient for each color pixel (e.g., red, green, blue (RGB)) of the display 160 under the control of the processor 120 or a display drive IC (DDI). Under the control of the processor 120 or the display drive IC (DDI), the display 160 may calculate information associated with power consumption for each frame according to the calculated brightness ratio of the display 160. The display 160 may transmit, the calculated information associated with power consumption to the processor 120 under the control of the processor 120 or the display drive IC (DDI). When the calculated information associated with the power consumption is transmitted to the processor 120 under the control of the processor 120 or the DDI, the electronic device 101 may calculate an average power consumption during a predetermined period of time, and may transmit the calculated information to the processor 120. The DDI may be a device included in the display 160. The processor 120 may predict current consumption of the display 160 based on the information associated with the calculated power consumption, which has been transmitted from the display 160.

According to various embodiments, the processor 120 may determine current consumption of the display 160 to be predicted based on the information associated with the calculated power consumption, which has been transmitted from the display 160.

The operation in which the electronic device 101 monitors current consumption may be an operation in which the electronic device 101 monitors the transmit power of the RF module 198 under the control of the processor 120 or the auxiliary processor 123 (e.g., a CP). The electronic device 101 may predict current consumption of the RF module 198 based on the transmit power, under the control of the processor 120 or the auxiliary processor 123. The operation in which the electronic device 101 predicts current consumption based on transmit power, under the control of the processor 120 or the auxiliary processor 123 (may predict current consumption using a table listing power based on transmit power, which is stored in a register of the processor 120.

According to various embodiments, the electronic device 101 may determine current consumption of the RF module 198 to be predicted based on the transmit power, under the control of the processor 120 or the auxiliary processor 123. The operation in which the electronic device 101 determines current consumption to be predicted based on transmit power, under the control of the processor 120 or the auxiliary processor 123 (may determine current consumption using a table listing power based on transmit power, which is stored in a register of the processor 120.

The operation in which the electronic device 101 monitors current consumption may be, an operation of detecting a mode of the camera module 180 or an intention to use the camera module 180. Under the control of the processor 120, the electronic device 101 may predict current consumption of the camera module 180 based on the mode of the camera module 180 or the intention to use the camera module 180. According to various embodiments, under the control of the processor 120, the electronic device 101 may determine current consumption of the camera module 180 to be predicted based on the mode of the camera module 180 or the intention to use the camera module 180.

The operation in the which electronic device 101 monitors current consumption may be an operation of calculating power consumption using a voltage-current (VI) sensing function included in an amplifier of the sound output device 155. Under the control of the processor 120, the electronic device 101 may predict current consumption of the sound output device 155 at regular intervals using the calculated power consumption, and may store information obtained via the VI sensing function at regular intervals. According to various embodiments, under the control of the processor 120, the electronic device 101 may determine current consumption of the sound output device 155 to be predicted at regular intervals using the calculated power consumption, and may store information obtained via the VI sensing function at regular intervals.

The operation in which the electronic device 101 monitors current consumption may be an operation of monitoring the data throughput of the communication module 190.

The operation in which the electronic device 101 monitors the temperature of a thermistor may be an operation of monitoring the temperature of the charging module 187.

The electronic device 101 may predict current consumption of the communication module 190 based on the data throughput.

According to various embodiments, the electronic device 101 may determine current consumption of the communication module 190 to be predicted based on the data throughput.

In step 303, the electronic device 101 may determine whether the monitored current consumption is greater than or equal to a predetermined current.

When the electronic device 101 determines that the monitored current consumption is less than or equal to the predetermined current in step 303, the electronic device 101 proceeds with step 301.

When the electronic device 101 determines that the temperature of a thermistor is less than or equal to a predetermined temperature in step 303, the electronic device 101 proceeds with step 301.

When the electronic device 101 determines that the monitored current consumption is greater than or equal to the predetermined current in step 303, the electronic device 101 proceeds with step 305.

When the electronic device 101 determines that the temperature of the thermistor is greater than or equal to the predetermined temperature in step 303, the electronic device 101 proceeds with step 305.

In step 305, the electronic device 101 may predict a first surface temperature and may detect a location where heat is generated. The first surface temperature that the electronic device 101 predicts in step 305 may be a present surface temperature of the electronic device 101.

According to various embodiments, in step 305, the electronic device 101 may determine a first surface temperature to be predicted and may detect a location where heat is generated. The first predicted surface temperature that the electronic device 101 determines in step 305 may be a present surface temperature of the electronic device 101.

The electronic device 101 predicts the first surface temperature under the control of the processor 120 in step 305 based on current consumption monitored based on a thermal resistance and thermal capacitance modeling (e.g., an RC modeling) scheme for each component of the electronic device 101. The thermal resistance and thermal capacitance modeled for each component may be stored in the memory 130 or a register of the processor 120.

According to various embodiments, the electronic device 101 determines the first surface temperature to be predicted under the control of the processor 120 in step 305 based on current consumption monitored based on a thermal resistance and thermal capacitance modeling (e.g., an RC modeling) scheme for each component of the electronic device 101. The thermal resistance and thermal capacitance modeled for each component may be stored in the memory 130 or a register of the processor 120.

The method of predicting the surface temperature for each component of the electronic device 101 may use Equation (1) below.

$$\begin{bmatrix} T1 \\ T2 \end{bmatrix} = \begin{bmatrix} \theta 11 & \theta 12 \\ \theta 21 & \theta 22 \end{bmatrix} S \begin{bmatrix} q1 \\ q2 \end{bmatrix} \quad (1)$$

On the assumption that power consumption based on current consumption of a first component of the electronic device 101 is q1, power consumption based on current consumption of a second component is q2, the surface temperature of a first point is T1, and the surface temperature of a second point is T2, when T1 and T2 are predicted according to Equation 1, θ11 is a thermal resistance and thermal capacitance from the first component to the first point, and θ12 is a thermal resistance and thermal capacitance from the second component to the first point. θ21 is a thermal resistance and thermal capacitance from the first component to the second point, and θ22 is a thermal resistance and thermal capacitance from the second component to the second point.

The first point may be a point that is in a vertical distance to the first component. The second point may be a point that is in a vertical distance to the second component. When it is assumed that the temperature based on current consumption of the first component of the electronic device 101 is q1, the temperature based on current consumption of the second component is q2, the surface temperature of the first point is T1, and the surface temperature of the second point is T2, Equation (1) may be used. θ11 may be a thermal conductivity from the first component to the first point, and θ12 may be a thermal conductivity from the second component to the first point. θ21 may be a thermal conductivity from the first component to the second point, and θ22 may be a thermal conductivity from the second component to the second point.

When T1 which is the surface temperature at the first point and T2 which is the surface temperature at the second point are expressed using a thermal resistance and thermal capacitance, they may be expressed by Equation (2) and Equation (3) below.

$$T1(RC1)=RC11+RC12=\theta 11 sq1+\theta 12 sq2 \quad (2)$$

$$T2(RC2)RC21+RC22=\theta 21 Sq1+\theta 22 Sq2 \quad (3)$$

The thermal resistance and thermal capacitance may be information (e.g., empirical information that is experimentally obtained) in association with the electronic device 101. The information associated with thermal resistance and thermal capacitance based on the amount of current or power consumed for each component may be stored in the memory 130 of the electronic device 101.

The information associated with thermal resistance (RC1) and thermal capacitance (RC2) based on the amount of current or power consumed for each component may be stored in the memory 130 in the form of a lookup table.

The thermal resistance (RC1) may be the surface temperature T1 at the first point. RC11 may be the temperature at the first point as the first component consumes current. R12 may be the temperature at the first point as the second component consumes current.

The thermal resistance (RC2) may be the surface temperature T2 at the second point. RC21 may be the temperature at the second point as the first component consumes current. R22 may be the temperature at the second point as the second component consumes current.

According to the thermal resistance and thermal capacitance modeling (RC modeling) scheme, heat generated in a component as current is consumed and interaction therebetween may be modeled using a surface temperature.

Equation (1) is in a 2×2 matrix based on the first component and the second component, the matrix may be changed based on the number of components. For example, when the number of components is 7, the matrix may be provided in the 7×7 form.

In step 307, the electronic device 101 may predict a second surface temperature by analyzing power consumption of a component corresponding to a location where heat is generated.

According to various embodiments, in step 307, the electronic device 101 may determine a second surface temperature to be predicted by analyzing power consumption of a component corresponding to a location where heat is generated.

The second surface temperature may be a future surface temperature of a component corresponding to the location where heat is generated. A method of predicting the second surface temperature may be based on the above-described thermal resistance and thermal capacitance modeling (RC modeling) scheme.

In step 307, the electronic device 101 may determine whether the predicted second surface temperature is greater than or equal to a predetermined temperature.

When the electronic device 101 determines that the predicted second surface temperature is greater than or equal to the predetermined temperature in step 307, the electronic device 101 may proceed with step 311.

When the electronic device 101 determines that the predicted second surface temperature is less than or equal to the predetermined temperature in step 307, the electronic device 101 may proceed with step 301.

The predetermined temperature may be set when the electronic device 101 is manufactured, and may be updated over the network 195, or other server.

When it is determined that the predicted second surface temperature is greater than or equal to the predetermined temperature, the electronic device 101 may set a controllable target temperature in operation 311.

The electronic device 101 may control a control element so as to reduce power consumption in step 313, and may proceed with step 307.

The operation in step 311 may be an operation of changing a clock of the processor 120 when a component where heat is generated is the processor 120. The operation of limiting the clock of the processor 120 may include changing a present operating clock to a clock lower than the present operating clock (e.g., changing from a high-speed clock to a low-speed clock).

The operation in step 311 may be, an operation in which the processor 120 adjusts a brightness of the display 160 when the component where heat is generated is the display 160.

The operation in step 311 may be an operation in which the processor 120 lowers a volume of sound output from the sound output device 155 when the component where heat is generated is the sound output device 155.

The operation in step 311 may be an operation in which the processor 120 adjusts a throughput of the communication module 190 when the component where heat is generated is the communication module 190.

The operation in step 311 may be an operation in which the processor 120 adjusts the transmit power of the module 198 when the component where heat is generated is the RF module 198, which may include adjusting a PAM so as to lower transmit power, adjusting a number of antennas, or the like.

The operation in step 311 may be an operation in which the processor 120 adjusts a frame rate of the camera module 180 when the component where heat is generated is the camera module 180.

The operation in step 311 may be an operation in which the processor 120 adjusts a charging current of the charging module 187 when the component where heat is generated is the charging module 187.

Figure 4:
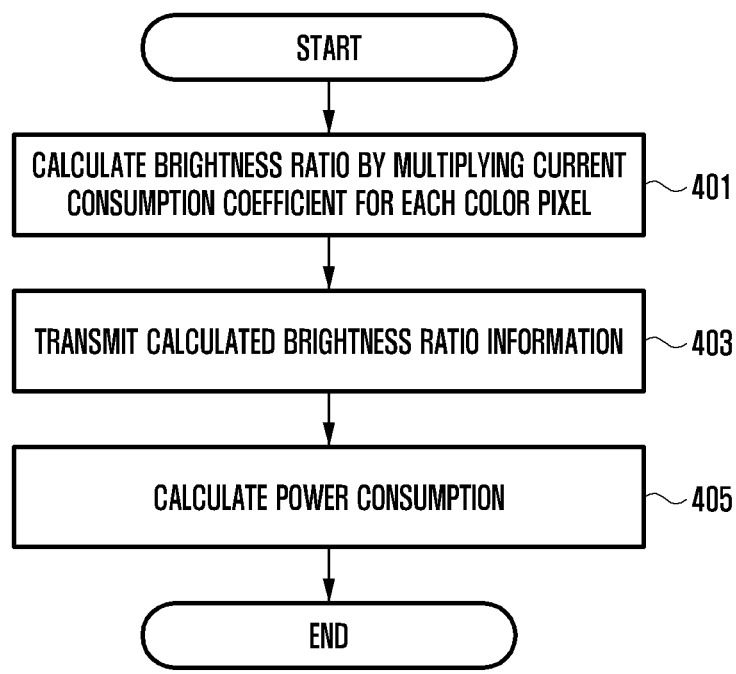
FIG. 4 is a flowchart of a method of monitoring current consumption of a display, according to an embodiment.

FIG. 4 is a flowchart of a method of monitoring current consumption of the display 160, according to an embodiment.

In step 401, the display 160 may calculate a brightness ratio (color on pixel ratio (COPR)) by multiplying a current consumption coefficient for each color pixel (e.g., R, G, and B) of the display 160, under the control of the processor 120 or a display drive IC (DDI).

The current consumption coefficient of a color pixel included in the display 160 may be different based on an organic matter included in the display 160.

In step 403, the display 160 may transmit information associated with the calculated brightness ratio (COPR) of the display 160 to the processor 120 under the control of the processor 120 or the DDI.

In step 405, the electronic device 101 may calculate power consumption of the panel of the display 160 using the information associated with the brightness ratio (COPR) calculated for each frame of an image and information associated with brightness, under the control of the processor 120 or DDI. The processor 120 may predict current consumption of the display 160 based on the information associated with the calculated power consumption of the display 160.

According to various embodiments, in step 405, the electronic device 101 may, calculate power consumption of the panel of the display 160 using the information associated with the brightness ratio (COPR) calculated for each frame of an image and information associated with brightness, under the control of the processor 120 or DDI. The processor 120 may determine current consumption of the display 160 to be predicted based on the information associated with the calculated power consumption of the display 160.

The DDI may be a device included in the display 160.

Figure 5:
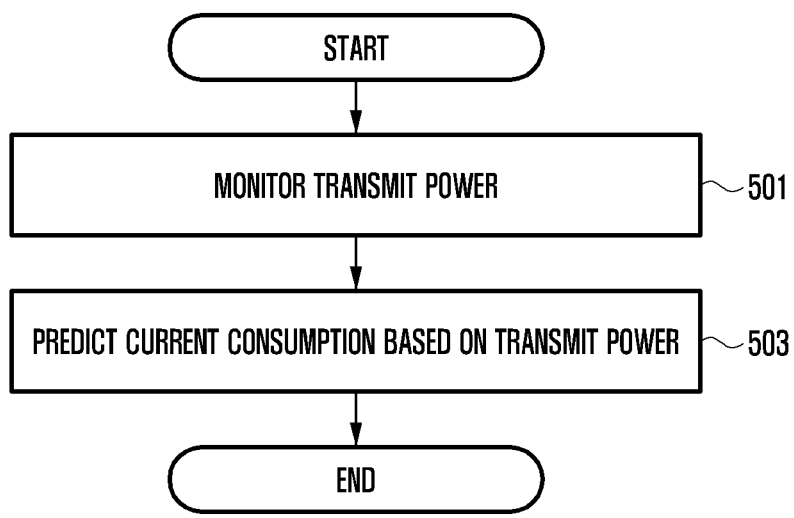
FIG. 5 is a flowchart of a method of monitoring current consumption of an RF module.

FIG. 5 is a flowchart of a method of monitoring current consumption of the RF module 198, according to an embodiment.

The electronic device 101 may monitor the transmit power of the RF module 198 under the control of the processor 120 or the auxiliary processor 123 in step 501.

In step 501, the electronic device 101 may predict the current consumption of the RF module 198 based on the transmit power, under the control of the processor 120 or the auxiliary processor 123.

According to various embodiments, in step 501, the electronic device 101 may determine the current consumption of the RF module 198 to be predicted based on the transmit power, under the control of the processor 120 or the auxiliary processor 123. The operation in step 501 may predict current consumption using a table listing power based on transmit power, which is stored in the register of the processor 120.

According to various embodiments, the operation in step 501 may determine current consumption to be predicted using a table listing power based on transmit power, which is stored in the register of the processor 120.

The operation in step 501 may predict current consumption using a table listing power based on transmit power, which is stored in the memory 130.

According to various embodiments, the operation in step 501 may determine current consumption to be predicted using a table listing power based on transmit power, which is stored in the memory 130.

Figure 6:
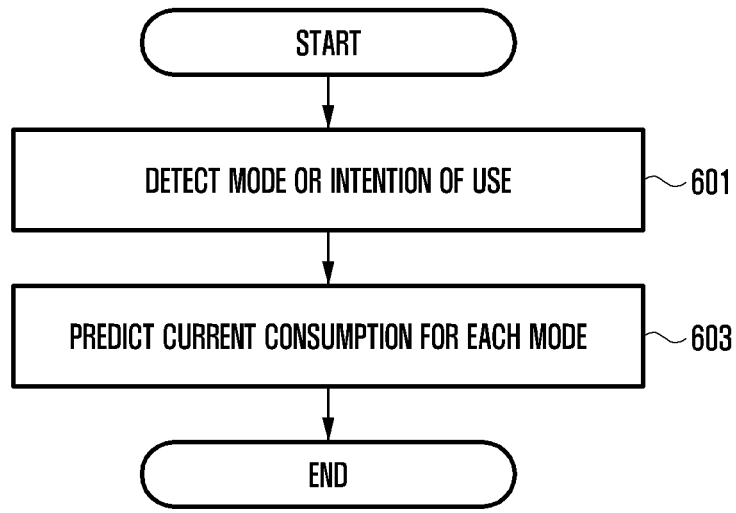
FIG. 6 is a flowchart of a method of monitoring current consumption of a camera module, according to an embodiment.

FIG. 6 is a flowchart of a method of monitoring current consumption of e camera module 180, according to an embodiment.

In step 601, the electronic device 101 may detect a mode of the camera module 180 or an intention to use the camera module 180.

In step 603, the electronic device 101 may predict the mode of the camera module 180 or the intention to use the camera module 180.

The operation in step 603 may predict current consumption using a table listing power consumption based on a mode of the camera module 180 or an intention to use the camera module 180, which is stored in the register of the processor 120.

The operation in step 603 may predict current consumption of the camera module 180 using a table listing power consumption based on a mode of the camera module 180 or an intention to use the camera module 180, which is stored in the memory 130.

According to various embodiments, in step 603, the electronic device 101 may determine the mode of the camera module 180 or the intention to use the camera module 180.

According to various embodiments, the operation in step 603 may determine current consumption to be predicted using a table listing power consumption based on a mode of the camera module 180 or an intention to use the camera module 180, which is stored in the register of the processor 120.

According to various embodiments, the operation in step 603 may determine current consumption of the camera module 180 to be predicted using a table listing power consumption based on a mode of the camera module 180 or an intention to use the camera module 180, which is stored in the memory 130.

The table listing power consumption based on a mode of the camera module 180 or an intention to use the camera module 180 is as shown in Table 1 provided below

TABLE 1

| Camera module sensor | Camera mode or intention of use | Current consumption [mA] |
| --- | --- | --- |
| Back sensor (back camera) | FHD_30fps | 184.20 |
| | FHD_30fps_1.7× | 275.30 |
| | FHD_60fps | 187.5 |
| | UHD | 190.6 |
| | 4:3 | 190.2 |
| | 16:9 | 189.3 |

TABLE 1-continued

| Camera module sensor | Camera mode or intention of use | Current consumption [mA] |
|---|---|---|
| Front sensor (front camera) | FHD_30fps | 86.7 |
| | QHD | 86.9 |
| | 4:3 | 88.6 |
| | 16:9 | 83.5 |

Figure 7:
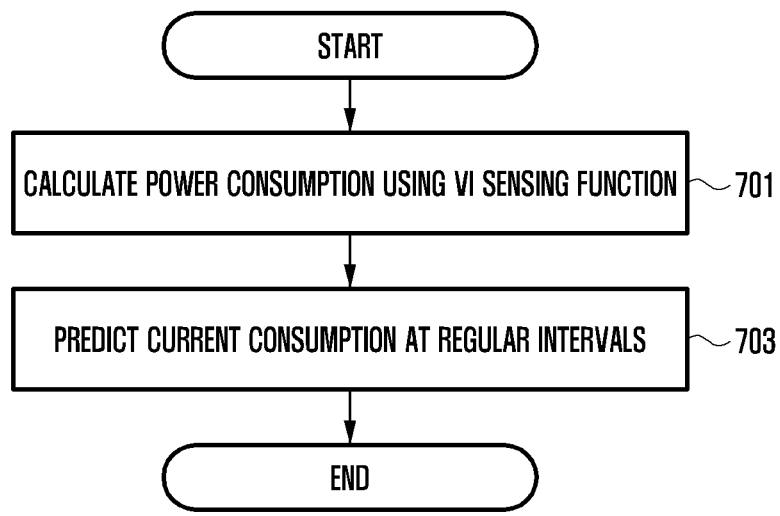
FIG. 7 is a flowchart of a method of monitoring current consumption of a sound output device, according to an embodiment.

FIG. 7 is a flowchart of a method of monitoring current consumption of the sound output device 155, according to an embodiment.

In step 701, the electronic device 101 calculates power consumption using a VI sensing function included in an amplifier of the sound output device 155.

In step 703, the electronic device 101 may predict current consumption of the sound output device 155 at regular intervals using the calculated power consumption, and may store information obtained via the VI sensing function at regular intervals.

According to various embodiments, in step 703, the electronic device 101 may determine current consumption of the sound output device 155 to be predicted at regular intervals using the calculated power consumption, and may store information obtained via the VI sensing function at regular intervals.

Figure 8:
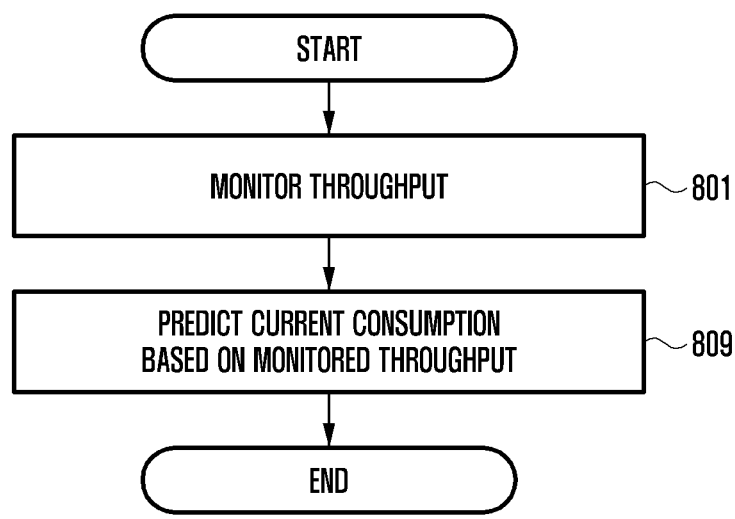
FIG. 8 is a flowchart of a method of monitoring current consumption of a communication module, according to an embodiment.

FIG. 8 is a flowchart of a method of monitoring current consumption of the communication module 190, according to an embodiment.

In step 801, the electronic device 101 monitors the data throughput of the communication module 190.

In step 803, the electronic device 101 may predict current consumption of the communication module 190 based on the data throughput. The processor 120 may predict current consumption based on data throughput, using a look up table stored in the memory 130 or the register of the processor 120.

According to various embodiments, in step 803, the electronic device 101 may determine current consumption of the communication module 190 to be predicted based on the data throughput. The processor 120 may determine current consumption to be predicted based on data throughput, using a look up table stored in the memory 130 or the register of the processor 120.

Figure 9:
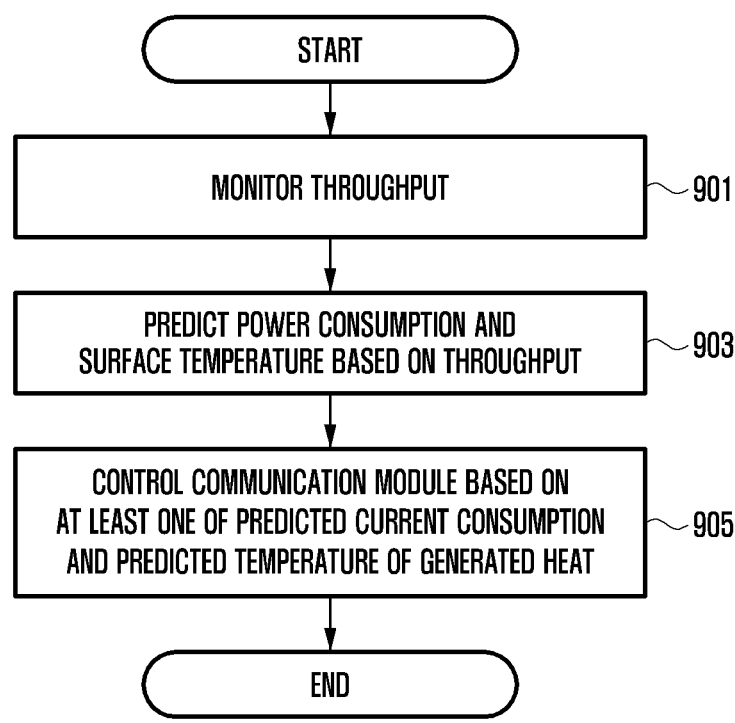
FIG. 9 is a flowchart of a method for control process based on current consumption of a communication module according to an embodiment.

FIG. 9 is a flowchart method of a control process based on current consumption of the communication module 190, according to an embodiment.

In step 901, the electronic device 101 monitors the data throughput of the communication module 190.

In step 903, the electronic device 101 may predict current consumption and the surface temperature of the communication module 190 based on the data throughput. The electronic device 101 may predict current consumption based on the data throughput using the look up table stored in the memory 130 or the register of the processor 120.

In step 903, the electronic device 101 may predict the surface temperature based on the current consumption associated with the data throughput.

When the electronic device 101 predicts the surface temperature, the above-described thermal resistance and thermal capacitance modeling (RC modeling) scheme may be used. The electronic device 101 may use the look up table stored in the memory 130 or the register of the processor 120 via the processor 120 to predict the surface temperature associated with current consumption based on the thermal resistance and thermal capacitance modeling (RC modeling).

According to various embodiments, in step 903, the electronic device 101 may determine current consumption to be predicted and the surface temperature of the communication module 190 to be predicted based on the data throughput. The electronic device 101 may determine current consumption to be predicted based on the data throughput using the look up table stored in the memory 130 or the register of the processor 120.

According to various embodiments, in step 903, the electronic device 101 may determine the surface temperature to be predicted based on the current consumption to be predicted associated with the data throughput.

According to various embodiments, when the electronic device 101 determines the surface temperature to be predicted, the above-described thermal resistance and thermal capacitance modeling (RC modeling) scheme may be used. The electronic device 101 may use the look up table stored in the memory 130 or the register of the processor 120 via the processor 120 to determine the surface temperature to be predicted associated with current consumption based on the thermal resistance and thermal capacitance modeling (RC modeling).

The look up table stored in the memory 130 or the register of the processor 120 may be as shown in Table 2 below

TABLE 2

| Operation mode | Data throughput | Current consumption | Surface temperature | Example of controlling data throughput | |
|---|---|---|---|---|---|
| | | | | WiFi module | Modem |
| Low-power mode (Power save) | 0~5 Mbps | ~60 mA | ~40 degrees | operate as TX, RX SISO minimize operating voltage (1.1 V), minimize operating clock, eLNA bypass | DRX path(Ant) off minimize operating voltage (0.9 V), minimize operating clock, eLNAbypass operationg |
| | 5~30 Mbps | ~100 mA | ~43 degrees | minimize operating voltage, (1.1 V) minimize operating clock, eLNA bypass operation | minimize operating clock, eLNA bypass operation |

TABLE 2-continued

| Operation mode | Data throughput | Current consumption | Surface temperature | Example of controlling data throughput | |
|---|---|---|---|---|---|
| | | | | WiFi module | Modem |
| | 30~90 Mbps | ~140 mA | ~45 degrees | adjust operating voltage (1.25 V) adjust operating clock | adjust operating voltage (1.05 V) adjust operating clock |
| Normal operation mode | 90~400 Mbps | ~250 mA | ~49 degrees | no limitation in operation | no limitation in operation |
| Heat control mode | 400~ Mbps | ~1 A | 50 degrees | operate as TX, RX SISO minimize operating voltage (1.1 V), minimize operating clock, eLNA bypass operation | DRX path(Ant) off minimize operating voltage (0.9 V), minimize operating clock, eLNA bypass operation |

In step 903, the electronic device 101 may predict the current consumption and the surface temperature based on the data throughput and a data processing duration. When the electronic device 101 predicts the current consumption and the surface temperature based on the data throughput and the data processing duration in step 903, the electronic device 101 may predict the current consumption and the surface temperature using a look up table.

The electronic device 101 may use the look up table stored in the memory 130 or the register of the processor 120 via the processor 120 to predict the current consumption and the surface temperature based on the data throughput and the data processing duration.

According to various embodiments, in step 903, the electronic device 101 may determine the current consumption to be predicted and the surface temperature to be predicted based on the data throughput and a data processing duration. When the electronic device 101 determines the current consumption to be predicted and the surface temperature to be predicted based on the data throughput and the data processing duration in step 903, the electronic device 101 may determine the current consumption to be predicted and the surface temperature to be predicted using a look up table.

According to various embodiments, the electronic device 101 may use the look up table stored in the memory 130 or the register of the processor 120 via the processor 120 to determine the current consumption to be predicted and the surface temperature to be predicted based on the data throughput and the data processing duration.

The look up table stored in the memory 130 or the register of the processor 120 may be as shown in Table 3 below.

TABLE 3

| Operation mode | Data throughput | Duration | Example of controlling data throughput | |
|---|---|---|---|---|
| | | | WiFi module | modem |
| Low-power mode (Power save) | 0~5 Mbps | 10 mins. | operate as TX, RX SISO minimize operating voltage (1.1 V), minimize operating clock, eLNA bypass operation | DRX path(Ant) off minimize operating voltage (0.9 V), minimize operating clock, eLNA bypass operation |
| | 5~30 Mbps | 10 mins. | minimize operating voltage, (1.1 V) minimize operating clock, eLNA bypass operation | minimize operating clock, eLNA bypass operation |
| | 30~90 Mbps | 10 mins. | adjust operating voltage (1.25 V) adjust operating clock | adjust operating voltage (1.05 V) adjust operating clock |
| Normal operation mode | 90~400 Mbps | 5 mins. | no limitation in operation | no limitation in operation |

TABLE 3-continued

| Operation mode | Data throughput | Duration | Example of controlling data throughput | |
|---|---|---|---|---|
| | | | WiFi module | modem |
| Heat control mode | 400~ Mbps | 20 mins. | operate as TX, RX SISO minimize operating voltage (1.1 V), minimize operating clock, eLNA bypass operation | DRX path(Ant) off minimize operating voltage (0.9 V), minimize operating clock, eLNA bypass operation |

Table 2 relates to predicting current consumption and a surface temperature associated with data throughput, and Table 3 relates to predicting current consumption and a surface temperature associated with data throughput and a data processing duration. In Table 3, a Wi-Fi module and a modem may be devices included in the communication module 190.

In step 905, the electronic device 101 may control the communication module 190 based at least one of predicted current consumption and a predicted surface temperature.

The electronic device 101 in step 905 may compare the current consumption predicted based on monitored data throughput and predetermined current consumption or may compare a predicted surface temperature and a predetermined temperature, and may control a clock, a voltage, and the number of antennas to change an operation mode.

The electronic device 101 in step 905 may control an operating clock, an operating voltage, and the number of antennas to change the operation mode of the electronic device 101 to a low-power operation mode when the current consumption predicted based on monitored data throughput is greater than or equal to predetermined current consumption or when a predicted surface temperature is greater than or equal to a predetermined temperature. Changing to the low-power operation mode by controlling at least one of a clock, a voltage, and the number of antennas may correspond to changing a clock to a low-speed clock, changing a voltage to a low-voltage, and reducing the number of antennas.

The electronic device 101 in step 905 may enable the electronic device 101 to enter a low-power mode so as to reduce current consumption of the electronic device 101 when the current consumption predicted based on monitored data throughput is less than or equal to predetermined current consumption or when the predicted surface temperature is less than or equal to a predetermined temperature.

A predetermined current and temperature for detecting a heat generation state and a predetermined current and temperature for changing the electronic device 101 to a low-power mode may be the same as, or different from, each other.

When the predicted current consumption is less than or equal to predetermined current consumption or when the predicted surface temperature is less than or equal to a predetermined temperature, an operating clock, an operating voltage, and the number of operating antennas may be controlled and the low-power operation mode may be changed. Changing the low-power operation mode by controlling a clock, a voltage, and the number of antennas may correspond to changing a clock to a low-speed clock, changing a voltage to a low-voltage, and reducing the number of antennas.

Figure 10:
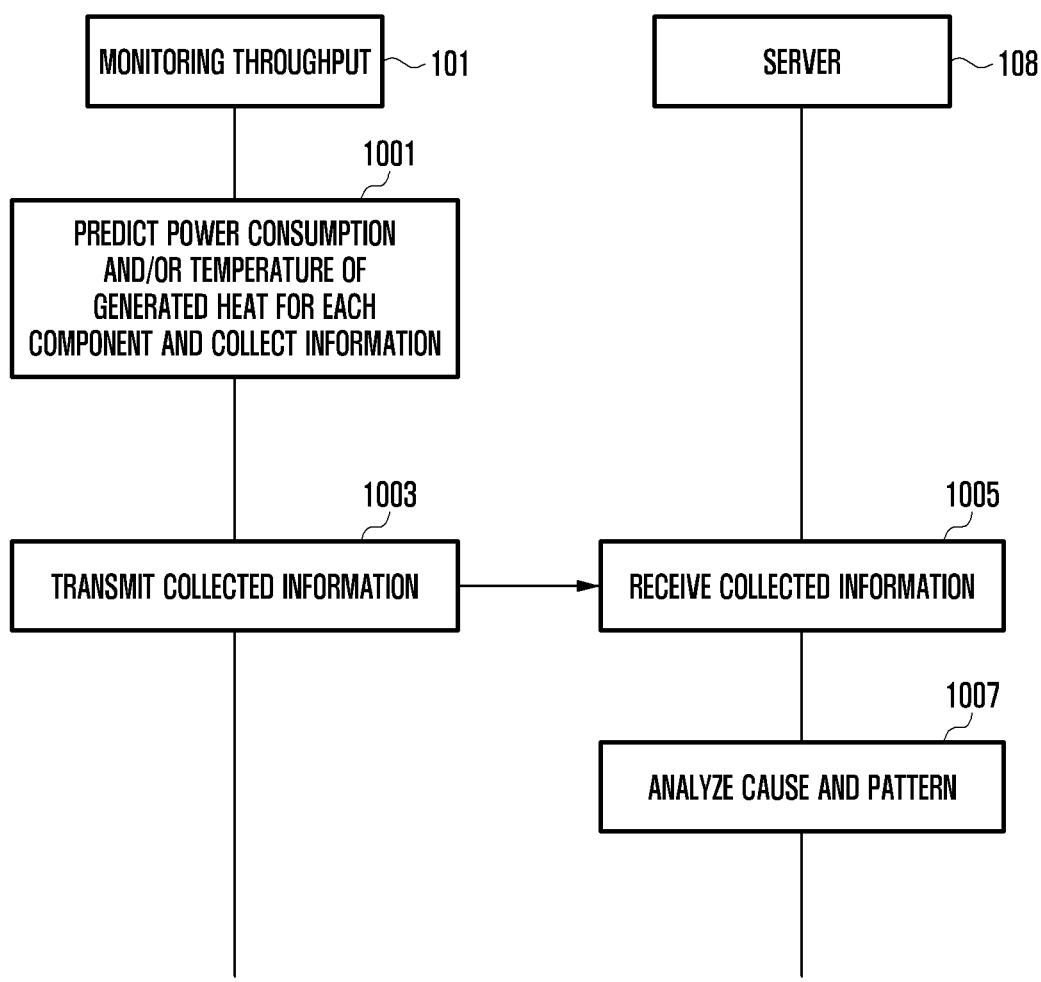
FIG. 10 is a flowchart of a method for data transmission between an electronic device and a server, according to an embodiment.

FIG. 10 is a flowchart of a method for data transmission between the electronic device 101 and the server 108, according to an embodiment.

In step 1001, the electronic device 101 may store, in the memory 130, information collected by predicting current consumption and/or the temperature of generated heat for each component of the electronic device 101.

In step 1003, the electronic device may transmit the information, which is collected by predicting the current consumption and/or the temperature of generated heat for each component of the electronic device 101 and is stored in the memory 130, to the server 108 via the communication module 190 at regular intervals.

In step 1005, the server 108 may receive, from the electronic device 101, the information collected by predicting the current consumption and/or the temperature of generated heat for each component of the electronic device 101, and may store the information in a memory.

In step 1007, the server 108 may analyze a cause of the heat generation or may analyze a user's use pattern, based on the information collected by predicting the current consumption and/or the temperature of generated heat for each component of the electronic device 101.

The operation in which the server 108 analyzes the cause of the heat generation or analyzes the user's use pattern based on the information collected by predicting the current consumption and the temperature of generated heat for each component of the electronic device 101, may include analyzing a component of which the predicted current consumption is high or a component of which the predicted temperature of generated heat is high as a component that the user frequently uses or as the cause of the heat generation.

Figure 11A:
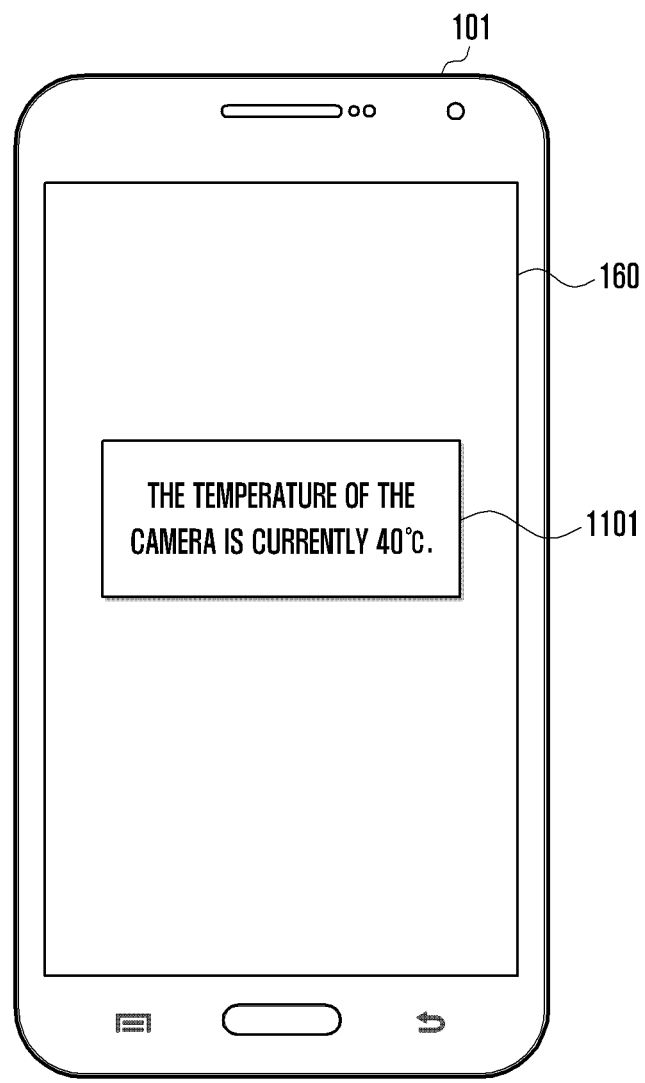
FIGS. 11A and 11B are diagrams of user interfaces when a heat generation phenomenon occurs in an electronic device, according to an embodiment.
Figure 11B:
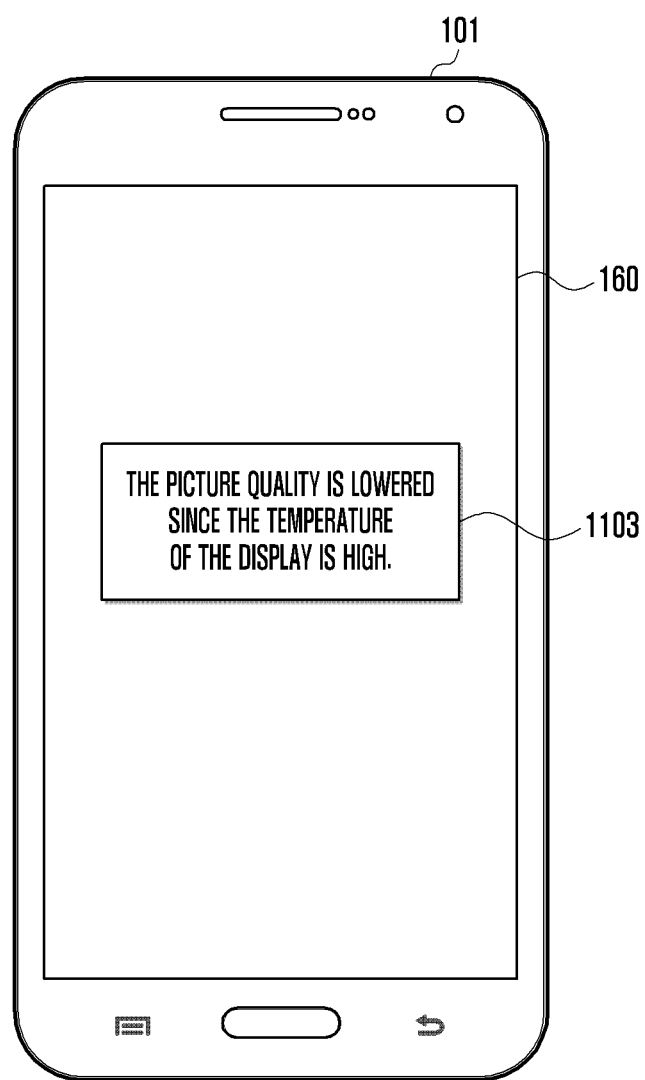

FIGS. 11A and 11B are diagrams of user interfaces when a heat generation phenomenon occurs in the electronic device 101 according to an embodiment.

When a surface temperature is greater than or equal to a predetermined temperature, the electronic device 101 may display, on the display 160, a pop-up window 1101 of FIG. 11A including a currently predicted surface temperature of a component where heat is generated, or the electronic device 101 may display a result 1103 of FIG. 11B after controlling the component based on the predicted surface temperature.

As described herein, the electronic devices and control methods associated therewith, may predict and control a surface heat temperature for each component, whereby a processor is necessarily controlled but a component is controlled. Accordingly, generated heat is effectively controlled.

As described herein, the electronic devices and control methods associated therewith, may control generated heat using information associated with a surface temperature that a user feels, as opposed to sensing the internal temperature of an electronic device using an internal thermistor of the electronic device, whereby generated heat may be controlled in the state in which the user feels the generated heat.

As described herein, the electronic devices and control methods associated therewith, may analyze a cause of heat generation and may analyze a user pattern using information obtained by predicting current consumption and/or the temperature of generated heat for each component.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. A control method by an electronic device, the method comprising:
    comparing current consumption for one or more components of the electronic device with a predetermined current;
    determining a first surface temperature of the electronic device based on the comparison and power consumption of the one or more components;
    detecting a location where heat corresponding to the first surface temperature is generated;
    obtaining a second surface temperature of the electronic device based on power consumption of a component disposed in the electronic device corresponding to the location where the heat is generated;
    setting a target temperature based on the obtained second surface temperature; and
    controlling the component to reduce the power consumption of the component based on the target temperature,
    wherein determining the first surface temperature and obtaining the second surface temperature are based on a thermal resistance value and a thermal capacitance value for each of the one or more components and the current consumption.

2. The method of claim 1, wherein:
    the first surface temperature is related to a current surface temperature of the electronic device, and the second surface temperature is related to a future surface temperature of the electronic device.

3. The method of claim 1, wherein the component includes at least one of a processor, a display, a camera module, a radio frequency (RF) module, a sound output device, a communication module, and a charging module.

4. The method of claim 3, wherein, when the component is the processor, the method further comprises:
    detecting current consumption of the processor based on power information of the processor detected via a power management module; and
    changing an operating clock of the processor.

5. The method of claim 3, wherein, when the component is the display, the method further comprises:
    calculating brightness for each color pixel of the display under the control of the processor;
    calculating information associated with power consumption for each frame based on the calculated brightness;
    determining current consumption to be obtained based on the calculated information associated with the power consumption; and
    adjusting the brightness of the display under the control of the processor.

6. The method of claim 3, wherein, when the component is the camera module, the method further comprises:
    determining current consumption of the camera module to be obtained using a lookup table associated with current consumption for each mode of the camera module; and
    changing a mode of the camera module under the control of the processor.

7. The method of claim 3, wherein, when the component is the sound output device, the method further comprises:
    calculating the power consumption using a voltage-current (VI) sensing function included in an amplifier of the sound output device;
    determining current consumption of the sound output device to be obtained based on the calculated power consumption; and
    controlling a volume of a sound output from the sound output device to be lowered under the control of the processor.

8. The method of claim 3, wherein, when the component is the RF module, the method further comprises:
    determining current consumption of the RF module to be obtained using a lookup table associated with current consumption for each transmit power of the RF module; and
    controlling transmit power of the RF module to be lowered under the control of the processor.

9. The method of claim 3, wherein, when the component is the communication module, the method further comprises:
    determining current consumption of the communication module to be obtained using a lookup table associated with current consumption for each data throughput of the communication module; and
    controlling one of an operating clock, an operating voltage, and a number of operating antennas of the communication module.

10. The method of claim 9, further comprising:
    controlling one of the operating clock, the operating voltage, and the number of operating antennas to change a low-power operating mode, when the current consumption is less than or equal to predetermined current consumption, or when an obtained surface temperature is less than or equal to a predetermined temperature.

11. The method of claim 3, wherein, when the component is the charging module, the method further comprises controlling a charging current of the charging module.

12. An electronic device for controlling current consumption and heat generation for one or more components of the electronic device, the electronic device comprising:
    a memory; and
    a processor configured to:
        compare current consumption for the one or more components with a predetermined current;
        determine a first surface temperature of the electronic device based on the comparison and power consumption of the one or more components;
        detect a location where heat corresponding to the first surface temperature is generated;
        obtain a second surface temperature of the electronic device based on power consumption of a component disposed in the electronic device corresponding to the location where the heat is generated;
        set a target temperature based on the obtained second surface temperature; and control the component to reduce the power consumption of the component based on the target temperature, wherein the first surface temperature and the second surface temperature are determined based on a thermal resistance value and a thermal capacitance value and the current consumption calculated for each of the one or more components.

13. The electronic device of claim 12, wherein:

the first surface temperature is related to a current surface temperature of the electronic device, and the second surface temperature is related to a future surface temperature of the electronic device.

14. The electronic device of claim 12, wherein the component includes one of the processor, a display, a camera module, a radio frequency (RF) module, a sound output device, a communication module, and a charging module.

15. The electronic device of claim 14, wherein, when the component is the processor, the processor is further configured to:

detect current consumption of the processor based on power information of the processor detected via a power management module; and change an operating clock of the processor.

16. The electronic device of claim 14, wherein, when the component is the display, the processor is further configured to:

calculate brightness for each color pixel of the display;

calculate information associated with power consumption for each frame based on the calculated brightness;

determine current consumption to be obtained based on the calculated information associated with the power consumption; and control the brightness of the display.

17. The electronic device of claim 14, wherein, when the component is the camera module, the processor is further configured to:

determine current consumption of the camera module to be obtained using a lookup table associated with current consumption for each mode of the camera module; and change a mode of the camera module.

18. The electronic device of claim 14, wherein, when the component is the sound output device, the processor is further configured to:

calculate the power consumption using a voltage-current (VI) sensing function included in an amplifier of the sound output device;

determine current consumption of the sound output device to be obtained based on the calculated power consumption; and control a volume of a sound output from the sound output device to be lowered.

19. The electronic device of claim 14, wherein, when the component is the RF module, the processor is further configured to:

determine current consumption of the RF module to be obtained using a lookup table associated with current consumption for each transmit power of the RF module; and control transmit power of the RF module to be lowered.

20. The electronic device of claim 14, wherein, when the component is the communication module, the processor is further configured to:

determine current consumption of the communication module to be obtained using a lookup table associated with current consumption for each data throughput of the communication module; and control one of an operating clock, an operating voltage, and a number of operating antennas of the communication module.

21. The electronic device of claim 20, wherein, when the current consumption is less than or equal to predetermined current consumption, or when an obtained surface temperature is less than or equal to a predetermined temperature, the processor is further configured to control one of the operating clock, the operating voltage, and the number of operating antennas to change a low-power operating mode.

22. The electronic device of claim 20, wherein, when the component is the charging module, the processor is further configured to control a charging current of the charging module.

* * * * *